Figure 1:
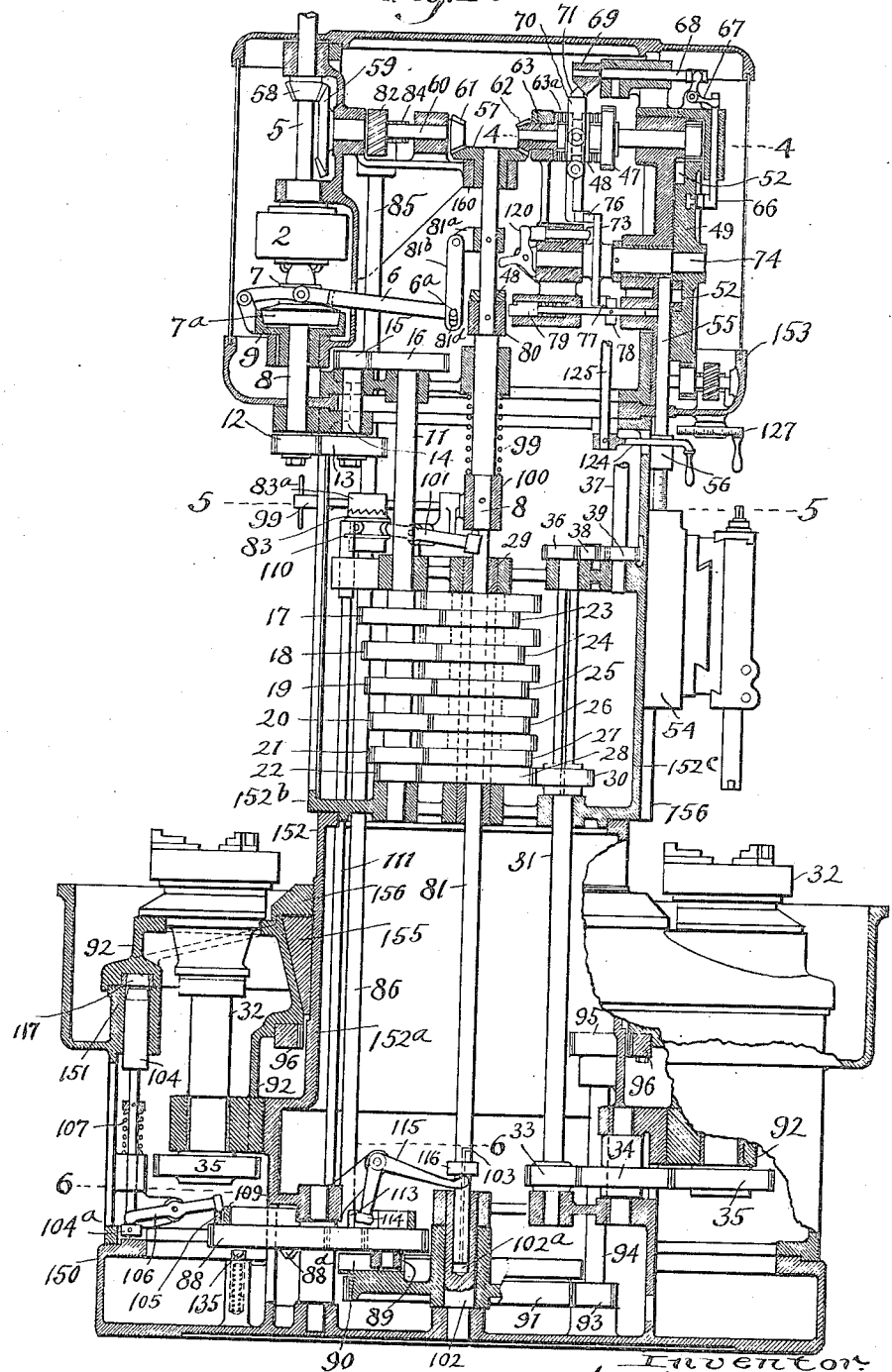

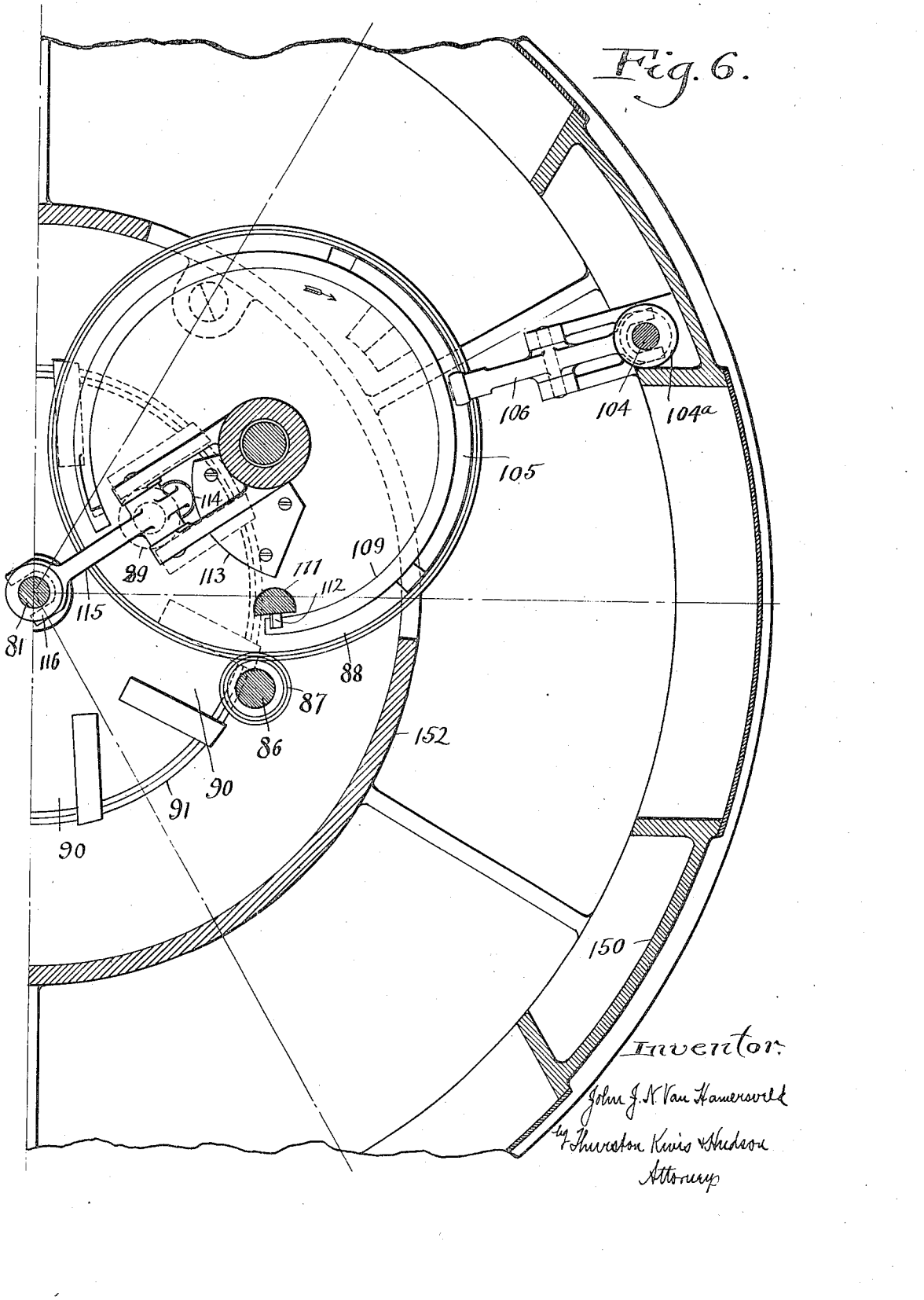

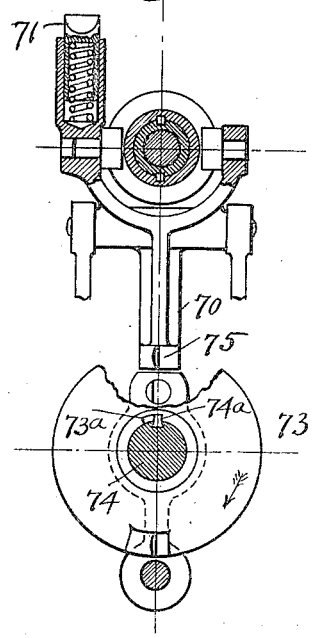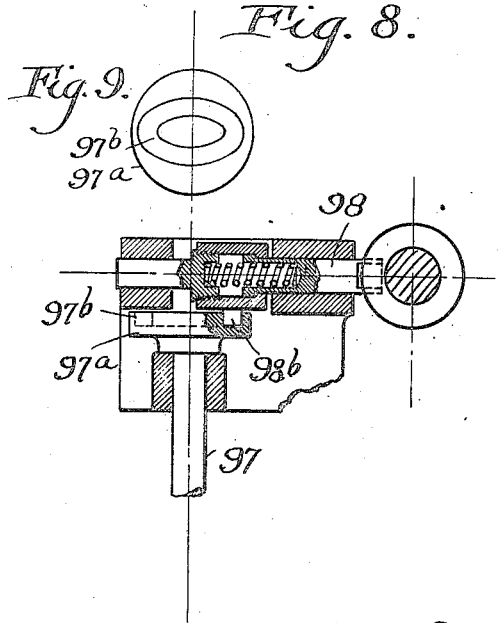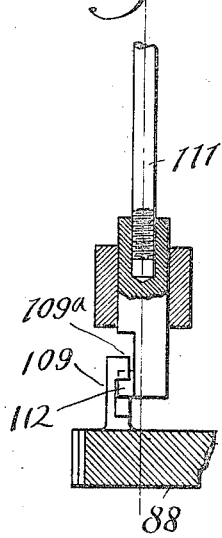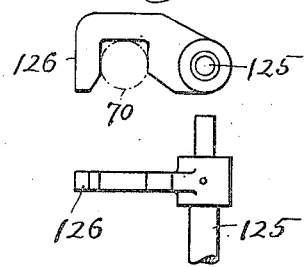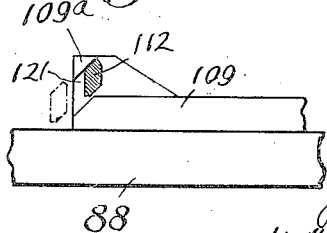

Patented Mar. 27, 1923.

1,449,464

UNITED STATES PATENT OFFICE.

JOHN J. N. VAN HAMERSVELD, OF CLEVELAND, OHIO, ASSIGNOR TO THE WARNER AND SWASEY COMPANY, OF CLEVELAND, OHIO, A CORPORATION OF OHIO.

AUTOMATIC MACHINE TOOL.

Application filed November 15, 1920. Serial No. 424,139.

*To all whom it may concern:*

Be it known that I, JOHN J. N. VAN HAMERSVELD, a citizen of the United States, residing at Cleveland, in the county of Cuyahoga and State of Ohio, have invented a certain new and useful Improvement in Automatic Machine Tools, of which the following is a full, clear, and exact description.

This invention relates to the kind of automatic machine tools which are commonly known as multiple spindle chucking machines. The machine contains a turret on which a plurality of work holding spindles are rotatably mounted and are arranged symmetrically around the axis of said turret.

The turret is associated with indexing mechanism by which the turret will be periodically turned through short arcs and the spindles thereby carried successively into working relation to each of several tool slides with which the machine is provided.

In machines of this character the several tool slides operate simultaneously upon work pieces secured to different spindles, and each piece of work is successively acted upon by tools carried by the several tool slides.

The object of the invention is to produce a highly efficient machine of this general character, a machine which by comparison with any machine of this character with which I am familiar will be less complicated, of lighter weight, cheaper to manufacture, more rapid and positive in its action, and will have a wider range of uses.

To this end the invention consists in the construction and combination of parts shown in the drawings, hereinafter described and pointed out definitely in the appended claims.

Figure 2:
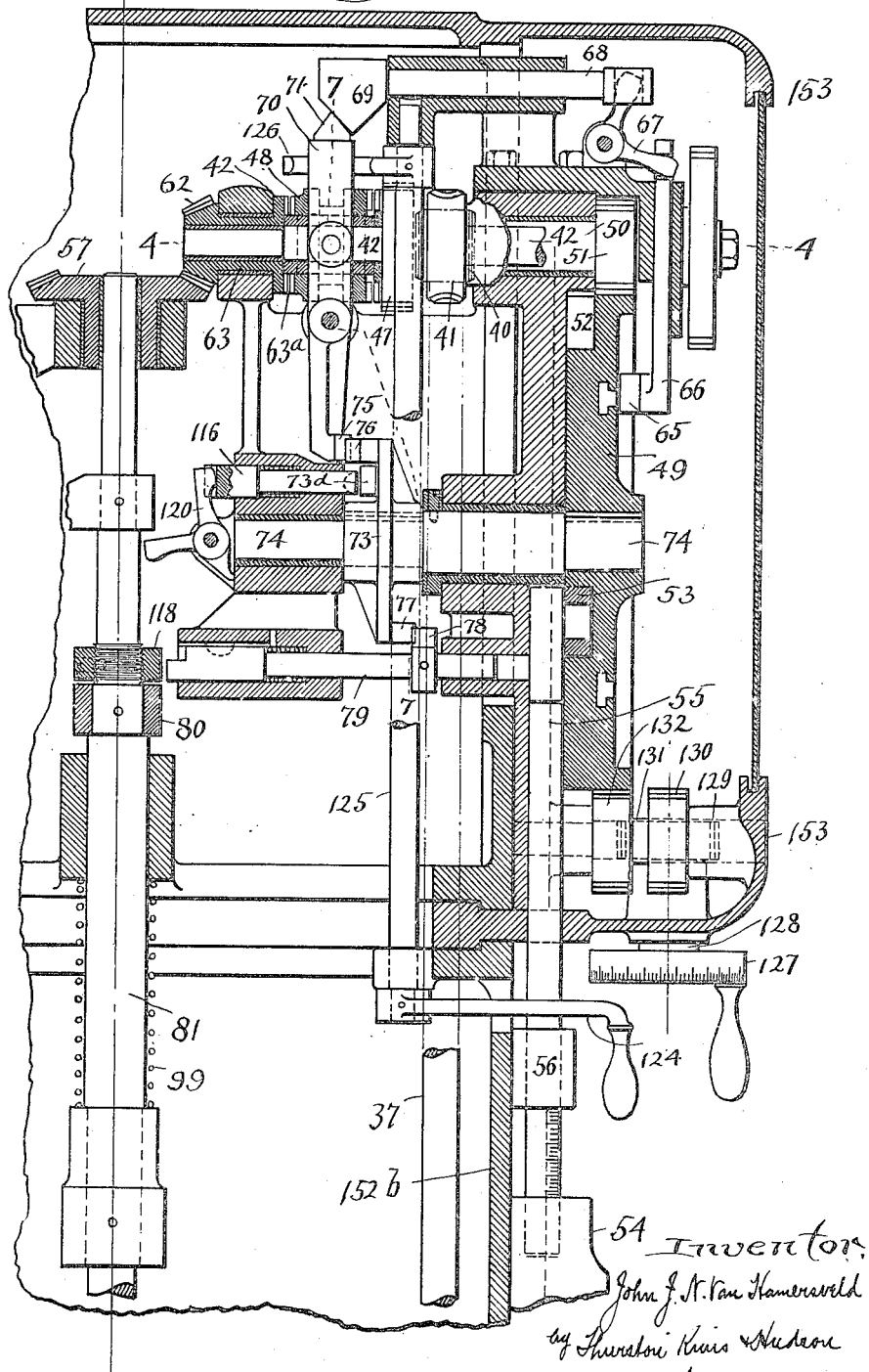
Figure 3:
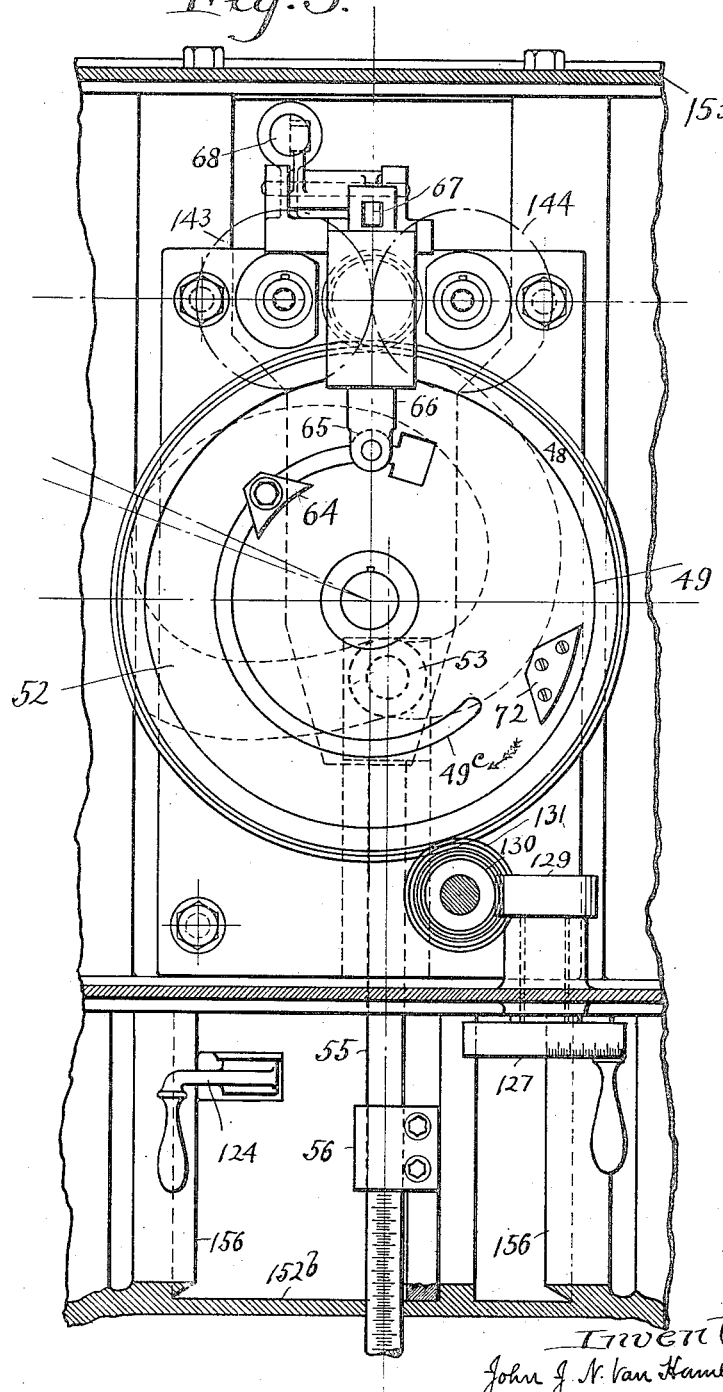
Figure 4:
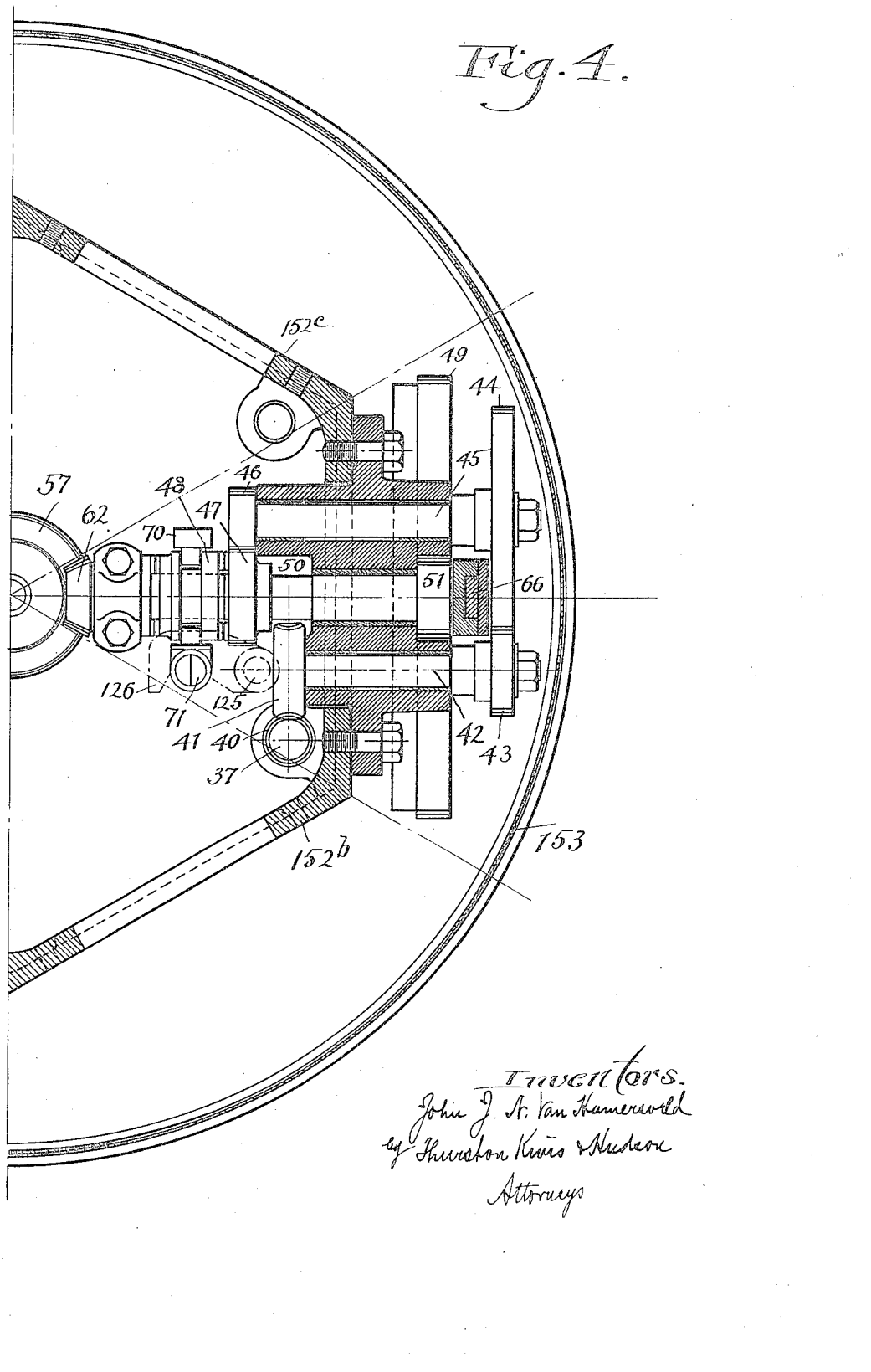
Figure 5:
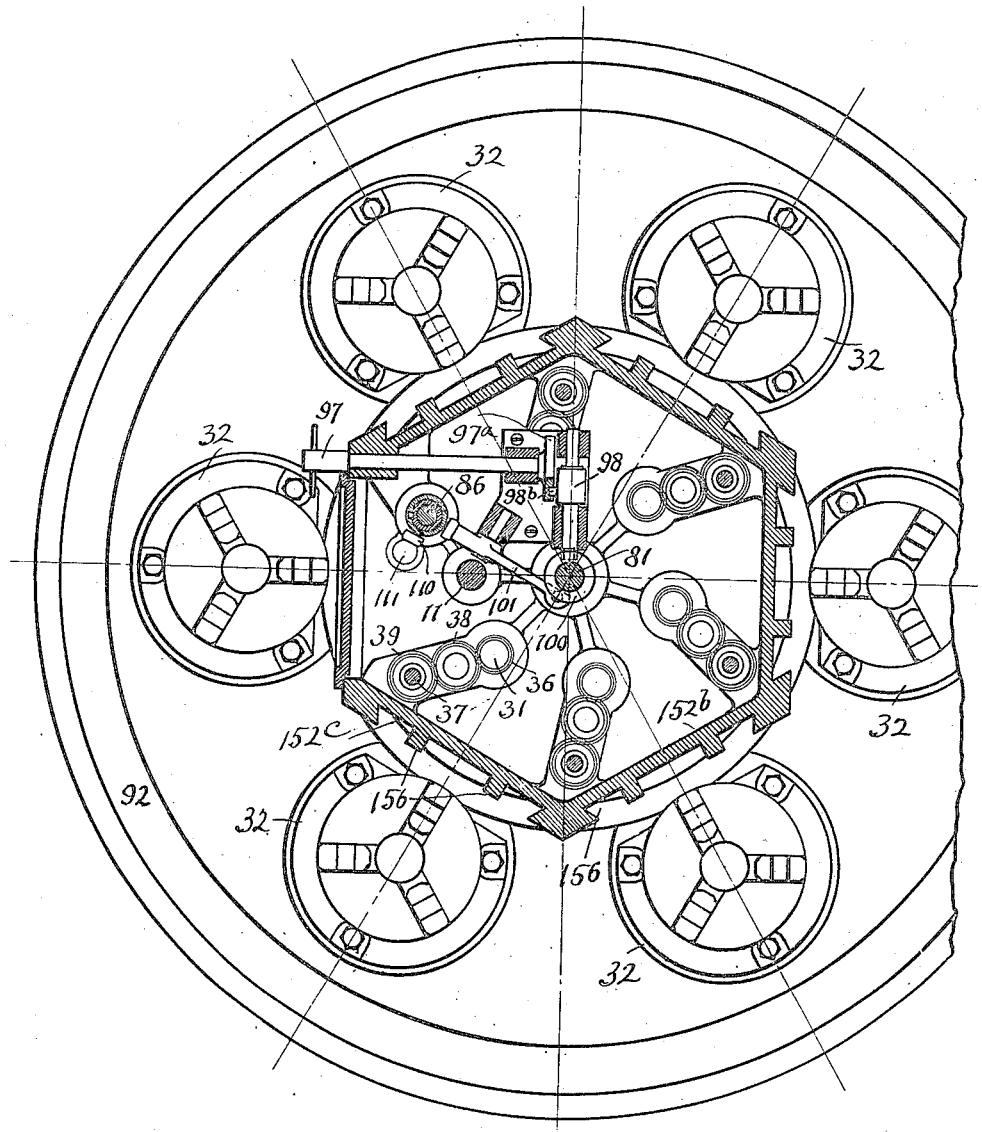

In the drawing, Fig. 1 is a central vertical sectional view of a machine embodying the invention; Fig. 2 is an enlarged vertical sectional view of one of the tool slide operating mechanisms. Fig. 3 is an elevation of a tool slide operating mechanism with the tool slide removed. Fig. 4 is a horizontal section in the plane of line 4—4 on Fig. 1, showing one half of the frame work of the machine and a part of one tool slide operating mechanism. Fig. 5 is a sectional plan view in the plane of line 5—5 on Fig. 1; Fig. 6 is a sectional plan view of one half of the base mechanism on broken line 6—6 on Fig. 1; Fig. 7 is a vertical section in the plane of line 7—7 on Fig. 2 of the control disk 73 and the parts associated therewith. Fig. 8 is a vertical sectional view of the manually operable mechanism through which a machine may be stopped and started; Fig. 9 is a face view of the cam which forms a part of that mechanism; Fig. 10 is a vertical sectional view through an edge of the Geneva motion gear 88 and of certain mechanism by which to control the Geneva motion clutch. Fig. 11 is a fragmentary view showing the end of the cam which is shown in Fig. 10 and the dog on the lower end of the clutch control rod. Figs. 12 and 13 are respectively a side elevation and a top view of the lever for moving the feed mechanism clutch in the neutral position and holding it there temporarily.

The frame work of the machine is made up of a number of hollow castings secured together by bolts, screws, etc., according to common practice; and has when completed a hollow base 150, a hollow central column 152 which rises from the base, and a hollow head 153 which is located above and is supported by the central column. The lower part 152ª of the central column is cylindrical and the turret 92 is rotatably mounted thereon. The part 152ᵇ of the central column between the cylindrical part thereof and the head is in the form of a regular polygon in cross section having as many flat vertical sides 152ᶜ as there are work holding spindles in the machine. In the present case there are six of such spindles, and therefore the polygonal part of the column is in the form of a regular hexagon. Five of the flat sides of this hexagonal part of the column are provided with vertical guide ribs 156 for as many tool slides 54. The mechanism of the machine as now to be described, is supported upon this frame, most of it being inside of the hollow frame and being supported by various arms, brackets, spindles, etc., which are rigid parts of the completed frame.

The space within the hollow frame is in effect divided into six parts, as indicated.

Each of the five parts adjacent those five walls on which tool slide guides are provided, contain and house mechanism for actuating the tool slide, and spindle driving mechanism for driving that spindle which is in working relation to said tool slide. The part within the hollow frame adjacent that flat side of the column which does not carry a tool slide, and the central space within the hollow frame, houses the mechanism which is common to all tool slide feed mechanisms, and all of the spindle driving mechanisms.

There are five similar sets of tool slide operating mechanisms, and also five similar sets of spindle rotating mechanisms. This furnishes five working stations and one loading station; that is to say, when any spindle is in a position in which it is in working relation with a tool slide it is in what will be hereafter termed a working station; but when a spindle comes to that side of the machine which does not support a tool slide and which does not contain spindle operating mechanism, it is in what is termed the loading station.

The five tool slide operating mechanisms and the five spindle rotating mechanisms are all simultaneously operated from the general mechanism which is located as stated centrally within the hollow frame and adjacent that side thereof which does not carry a tool slide.

General mechanism.

The vertical shaft 5 may be regarded as the main driving shaft of the machine. It may be driven from any source of power; and the machine is organized so as to perform its functions if this shaft is driven constantly.

Below but aligned with shaft 5 is a vertical shaft 8. A friction clutch 2 is provided for connecting and disconnecting these shafts. The movable clutch member 7 is keyed to but slidable upon shaft 8, and it has a cone-shaped lower end 7ª for engaging a brake seat 9. The clutch member is operated by lever 6. When the clutch member is moved up the two shafts will be clutched together. When it is moved down its conical end engages in the brake seat; it acts as a brake to stop the rotation of shaft 8.

Shaft 8 drives cone shaft 11 by means of a gear train consisting of gears 12 and 13, shaft 14, and gears 15, 16. The two meshing gears 12, 13, are below the lower wall of the projecting part of the head, and they are change speed gears, being removably secured to the lower ends of the shafts 8 and 14. Gear 15 is fixed to shaft 14, while gear 16 is fixed to the gear cone shaft 11. Fixed to this gear cone shaft is a gear cone comprising a plurality of spur gears 17, 18, 19, 20, 21, 22, of different diameters. Adjacent this gear cone and parallel with it is a fixed bearing sleeve 29 which is located centrally within the hollow frame column. On it a plurality of gear sleeves 23, 24, 25, 26, 27, 28, are mounted for independent rotation. Each of these gear sleeves except the lower one is provided with two gears, the lower one of which is in mesh with one of the gears of the gear cone. These lower gears of the several gear sleeves are obviously of different diameters, wherefore the various gear sleeves will rotate at different rates. The upper gears of all the gear sleeves are of the same size; and any one of them may be in mesh with a certain spur gear 30. There are five of these spur gears, and each is slidable upon and keyed to a shaft 31. Each of these shafts 31 is a part of a set of spindle driving mechanism. Obviously the several gears 30 can be set to mesh with any one of the equal sized gears on the gear sleeves, and therefore each of the several shafts 31 may be rotated at any of six different speeds, depending upon the gear sleeve with which it is connected. The lowest sleeve 28 of the gear sleeves has and needs only one gear, which gear is of the same diameter as upper equal sized gears on the other gear sleeves.

Spindle driving mechanism.

There are six work holding spindles 32 which are rotatably mounted upon the turret 92. These are symmetrically arranged equal distances from the axis of the turret and equal distances from each other. To the lower end of each spindle a spur gear 35 is fixed. There are five idler gears 34 one in mesh with each of the gears 33, which gears are secured to the lower ends of the five spindle driving shafts 31. These idler gears are in such position that when, by the turning of the turret, the spindles are brought into working position, a gear 35 in the lower end of each spindle will engage with the then adjacent idler gear 34 and will be thereby rotated. There is no idler gear 34 and no shaft 31 at the so-called loading station. Therefore, although each spindle gear 35 moves into mesh with an idler gear 34 when the spindle comes into a working position, whereby the spindle is rotated, the said spindle, when it comes to the loading station, is not rotated because there is no idler gear 34 at this point to rotate it.

Turret mechanism.

The turret 92 is rotatably mounted upon the cylindrical lower part of the central frame column. Its edge projects over and rests upon the upper edge of a cylindrical flange 151, which is a part of the base.

In the upper part of the turret is, however, a conical axial recess which fits upon a cone 155 which is fitted around the cylindrical part of the frame column, and is held down so as to nicely fit within the conical recess of the turret and thereby center the turret by a nut 156 which has a screw threaded engagement with the central column.

Fixed to the turret is an internal gear ring 96. A gear 95 meshes with this internal gear, said gear 95 being fixed to the upper end of shaft 94 which has at its lower end a spur gear 93 which is in mesh with the center gear 91,—said gear being rotatably mounted in the base on a fixed shaft 102 whose axis is coincident with the central axis of the machine. This center gear is provided upon its upper surface with six symmetrically disposed radial slots 90, whose outer ends are open.

Mounted in the base adjacent that side thereof at which the loading station is placed, and upon a vertical axis, is the Geneva motion gear 88, which gear supports, adjacent one edge and below its lower face, a roller 89 which is adapted to enter any of the open ended radial slots 90 on the central gear 91. This Geneva motion gear and central gear constitute what is commonly known as a Geneva motion drive. During each revolution of the Geneva motion gear 88 its roller will enter one of the slots of the central gear, and will turn the central gear, before the roller leaves the slot exactly one-sixth of a revolution,—there being six of said slots. The Geneva motion gear is driven by the following instrumentalities:

A vertical shaft 86 has a pinion 87 at its lower end in mesh with the Geneva motion gear 88. Above shaft 86 is an aligned shaft 85. The Geneva motion control clutch 83 is provided for connecting and disconnecting these shafts. This control clutch as shown is a positive jaw clutch having one member 83ª fixed to the lower end of shaft 85, the other member 83 being keyed to but movable lengthwise of shaft 86. A bevel gear 58 fixed to the main driving shaft 5 meshes with a bevel gear 59 fixed to horizontal shaft 60. Keyed to the shaft 60 is a spiral gear 82 which meshes with a spiral gear 84 fixed to the upper end of the shaft 85. Since the main driving shaft 5 is constantly driven it is obvious that the shaft 60 will be constantly driven, and so also will the shaft 85. Whether the Geneva motion shaft will be driven or not depends upon the position of the clutch member 83.

*Tool slide feed mechanism.*

The shaft 60 has at its inner end a constantly rotating beveled gear 61 which meshes with a beveled gear 57 which is rotatably mounted on a bracket 160 within the head, with its axis coincident with the central axis of the machine. This gear 57 is in mesh with five gears 62 each of which is associated with the mechanism for operating a tool slide. In fact, the gear sleeve 62, of which the gear 63 is a part, is the fast driving member of that particular tool slide operating mechanism.

The slow driving member of each tool slide is a gear sleeve 47 which is rotatively mounted on a shaft 42, which is axially aligned with the gear sleeve 63. The two gear sleeves 63 and 47 have on their opposed faces clutch jaws for engagement by clutch jaws on the ends of a sliding clutch sleeve 48 which is supported by and has a tongue and groove connection with shaft 42.

The slow turning driving clutch member 47 is driven by the following train of mechanism. A vertical shaft 37 has a spur gear fixed to its lower end in mesh with an idler spur gear 38 which in turn meshes with a spur gear 36 fixed to the upper end of shaft 31. On the upper end of shaft 37 is a worm 40 (see Figs. 2 and 4) which meshes with a worm wheel 41 fixed to the inner end of a horizontal shaft 42 which shaft has a spur gear 43 removably fixed to its outer end. This is in mesh with a spur gear 44 which is removably fixed to the outer end of a parallel shaft 45. These two gears 43, 44, being removable, are change speed gears. By their removal and the substitution of other similar gears of different relative sizes, a change may be made in the rate at which shaft 45 is turned relatively to the rate at which the associated spindle is turned. Fixed to the inner end of shaft 45 is spur gear 46, which is in mesh with a spur gear 47. The shaft 50 carries at its outer end a spur gear 51 which is in mesh with gear teeth on the edge of a vertical cam disk 49 having in its inner face a cam groove 52. (See Fig. 3.) A roller 53 operates in said groove, and is carried by a sliding rod 55 which is fastened to the associated tool slide by means which will be presently described. As the shaft 50 turns, the cam disk 49 will be turned at a corresponding rate, and therefore the tool slide will be moved down and up because of the shape of the cam groove and at a rate depending somewhat upon the shape of the cam groove, but more upon the rate at which the shaft 50 is turned. When the clutch member 48 is moved in one direction it clutches gear sleeve 47 to the shaft 50, and when it is moved in the other direction it clutches gear sleeve 63 to shaft 50. When this shaft is clutched to gear sleeve 47 the cam disk will be turned slowly, and therefore the tool slide will be moved slowly. The mechanism is so constructed, as will be presently described, that the cam disk is so turned slowly while the tool slide is in the lower part of its downward movement, and the tool is cutting the work piece on the then associated spindle. The shaft 50 will, however, be clutched to the sleeve 63 during the remainder of the movement of the tool slide, that is to say, when it is coming up and when it is moving down to the point where the cutting of the tool upon the work will begin.

Control mechanism.

In order that the various mechanisms which have been described shall perform the functions for which they are provided at the proper times, it is necessary to provide in the machine automatically acting control mechanism by which to cause the various mechanisms to operate in the proper sequence. The principal control member is a vertically movable control rod mounted axially in the machine and constantly subjected to the influence of a spring 99 tending to move it down. In its downward movement it releases the clutch 2 moving the movable clutch member down into the brake seat, whereby the brake is applied to the spindle operating mechanism with the result that it ceases to function. To produce the stated result there is a clutch operating lever 6 pivoted to a fixture and extending toward the control rod. A collar 81ª fixed to the control rod has a link 81ᵇ pivoted to and depending from it having a slot 81ᵈ near its lower end through which passes a pin 6ª fixed to the clutch operating lever. The purpose of the slot is to allow the control rod to move down a short distance equal to the length of the slot, from its extreme uppermost position without producing any functional effect upon the clutch operating lever 6.

Another effect of the downward movement of the center control rod is to close the clutch by which the Geneva motion operating shaft 86 is clutched to the constantly driven shaft 85. The clutching movement of the movable clutch member 83 is produced by an operating lever 101 which is pivoted to a fixture midway between its ends and extends from the clutch alongside of the control rod 81 and projects beneath a collar 100 fixed to said control rod. When, therefore, the control rod 81 is released from restraint, it drops instantly, and in dropping operates lever 6 causing the release of clutch 2 and the setting of brake 7, whereby the spindle operating mechanisms come to rest, and it likewise, by closing clutch 83 starts up the Geneva motion gear 88, which, as stated, is in mesh with a pinion fixed to the lower end of shaft 86.

The first result of the turning motion of Geneva motion gear 88 is to withdraw the lock pin 104 from its engagement with the turret. This lock pin is movable vertically in guideways supplied by the frame work and it is under the influence of spring 107 tending to move it up into that lock pin socket 117 which is brought into alignment with it. On its lower end it carries a collar 104ª upon the upper surface of which one end of a lever 106 engages. The other end of this lever overhangs the Geneva motion gear and carries a roller which may ride upon the top surface of the gear, and which may be engaged by a cam 105 formed upon the upper surface of the Geneva motion gear, said cam being so placed that it will act upon the lever and draw the lock pin completely from its engagement with the turret during the first three degrees of movement of said Geneva motion gear. The cam is not long, nor need it be because as soon as the turret is turned it will carry that lock bolt socket 117 from which the lock bolt has just been withdrawn out of alignment with the lock bolt. The lock bolt may then be released to the influence of its spring, which will force it up against the under face of the turret, and into the next lock bolt socket 117 which comes into alignment with it as the result of the turning of the turret. As the Geneva motion gear continues to rotate it will turn the center gear, and will through the described mechanism driven thereby turn the turret through an arc of 60°, thereby bringing all of the work spindles into new positions in which they will be held by the automatic snapping of the lock pin into the now aligned socket 117. On the Geneva motion gear is a cam 113 which is so placed that it will engage the roller 114 mounted on one arm of the bell crank lever 117, the other arm of which is forked and passes beneath a collar 116 which is on the center control rod 81. This cam is so placed that as soon as the turret has been moved through an arc of about 35°, this cam, by engaging the roller 114, will rock the lever 115, and thereby the center control rod 81 will be lifted. It will be raised by said mechanism a little above the position in which it will finally come to rest for certain reasons which will be stated; and will then descend for a distance of about an inch until the collar 80 thereon comes to rest above and in engagement with five horizontally movable lock pins 79 one of which is associated with each tool slide. As the control rod 81 goes up it will close the clutch 2 and therefore the spindle operating mechanism will begin to operate and so will those parts of the tool slide operating mechanism which receive their motion from the spindle driving shaft 31.

It is to be noted, however, that the center control rod does not open the clutch 83,—and should not because that clutch must continue to connect shafts 85, 86, until the Geneva motion gear has completed its revolution. This result is produced by means of a vertically movable rod 111 having at its upper end a roller 110 which engages in an annular groove in the movable clutch member 83 and prevents its descending until the rod itself descends. The descent of the rod is, however, prevented by means of a circular cam 109 carried by the Geneva motion gear; and upon this cam a dog 112, fixed to the lower end of the rod 111, rides. At the end of this cam is an inclined cam block 109$^a$ which is secured to the Geneva motion gear in such position that it engages in the corresponding upper inclined face of the dog 112, and thereby as the Geneva motion gear continues to rotate, pulls the rod 111 downward. In its downward motion it pulls the clutch member 83 downward out of engagement with the clutch 83$^a$ and thereby disconnects shafts 85, 86, whereupon the Geneva motion gear being deprived of power stops rotating. It is so deprived of its power, however, before it completes its revolution. Sometimes and under favorable conditions the momentum of the Geneva motion gear will carry it on to its starting point, and disengages the dog 112 from the overhanging cam by which the dog was moved downward, so that the dog and the rod 111 may be moved up again as stated. A vertically movable spring plunger 135 having a beveled upper end is mounted in the base; and a beveled cam 88$^d$ is provided on the lower face of the Geneva motion gear 88. This cam is so placed that it will have passed over the point of the spring plunger and will have depressed it when the clutch member 83 is positively lowered as stated. When the Geneva motion gear is thus disconnected from the mechanism for turning it, the reaction upward of this spring plunger against the beveled cam will continue to turn the Geneva motion gear a short distance, but a distance sufficient to entirely free the dog 112 from the restraining influence of the overhanging cam 109$^a$, and leave it free to move up when, later, the center control rod by its downward movement acts to move upward the clutch member 83 and again connect the shafts 85, 86.

As before stated, there are five spring actuated lock pins 79, one associated with each tool slide; and each of these acts independently of the others to prevent the descent of the control rod 81 by engaging beneath the collar 80 fixed to said control rod. Each tool slide as it reaches the top of its path acts, through mechanism to be described, to withdraw the associated lock pin. The withdrawal of four out of the five lock pins does not release the control rod. It is only when the last lock pin is withdrawn by the last slide to reach the top of its path that the control rod is freed from restraint.

There is, however, in the machine a hand controlled device for preventing or permitting the dropping of the control rod 81. This consists of a horizontal shaft 97 projecting out through the wall of the center column having an operating handle on its outer end. Upon its inner end is a disk 97$^a$ having in its inner face an elliptical groove 97$^b$. A pin 98$^b$ which projects laterally from the side of a horizontally movable spring actuated lock pin 98 enters this elliptical groove.

If the interval of time occupied by the slides in their down and up journeys is insufficient to enable the operator to remove a finished piece of work from and secure a new piece of work on that spindle which is at the loading station, the shaft 97 should be turned to that position in which the lock pin 98 may automatically engage the center control rod and prevent its descent. In that event the operator, when he has secured a new piece of work to the spindle in the loading position, will be obliged to turn shaft 97 and thereby withdraw lock pin 98.

If, however, the work being done in the machine is such that continuous operation is possible, the lock pin 98 is moved to and held in an inoperative position, in which event, when the last tool slide reaches the top of its path and withdraws the associated lock pin 79, the center control rod will at once descend and start the machine on a new cycle.

Obviously, the machine may be so adjusted for a given piece of work that any one of the tool slides may be the last to normally reach the top of its path. Therefore it has been thought wise to provide a lock pin for each slide, because thereby, the lock pin associated with that slide which is the last to reach the top becomes automatically the effective lock pin to prevent the premature dropping of the control rod.

When the five lock pins have been withdrawn, and the center control rod drops, the said lock pins remain in the withdrawn position until the center control rod is again lifted after the turret has been indexed. The center control rod, however, on its upward movement, releases the five lock pins, and they pass beneath the collar 80 and again proceed to act as before explained.

Associated with each slide operating mechanism and each lock pin 79 is a control disk 73 which is mounted upon the shaft 74 of the cam disk 49 by which the slide is moved up and down. This control disk has a one-way driving connection with this shaft. Specifically the shaft has a key 74$^a$ which projects into a keyway 73$^a$ which is wider than the width of the key. Therefore this disk may, after the shaft has come to rest, be turned in the same direction as that in which the shaft was turned through an arc equal to the excess of width of the keyway as compared with the key which projects into it. This independent forward movement of the control disk is through an arc of about 10°. On this control disk are three lugs 73$^d$, 76 and 77, each having a beveled face. Just as the cam disk 49 is completing its revolution and the associated tool slide is substantially in its uppermost position, the lug 76 comes into engagement with a bevel faced lug 75 on the lower end of the lever 70 which lever is that lever by means of which the movable clutch member 48 is shifted so as to cause it to selectively connect the cam disk 49 with the fast driving member 63, or the slow driving member 47, of the cam disk driving mechanism.

When the lug 76 does come into engagement with the lug 75 just before the control disk comes to rest, it will cause the lever 70 to be rocked to such an extent as is necessary to move the clutch member 48 into neutral position. Before it was so moved this clutch member was engaging the fast motion driving member 63, and the cam disk 49 was moving at fast speed and was therefore moving the associated tool slide up at fast speed. When the clutch member 48 is moved into neutral position, the control disk 73 stops rotating because it is likewise disconnected from any mechanism for rotating it.

While lug 76 was so disconnecting the clutch, the lug 77 on the control disk 73 was engaging the bevel faced lug 78 secured to the associated locking pin 79, and withdraw said locking pin to the inoperative position, whereby the center control rod 81 is released from the restraint of that particular locking pin.

The mechanisms associated with each tool slide and with the associated control disk 73 come to rest in the position which has been described. Then the center control rod drops and the indexing movement of the turret takes place as before described, because the descending control rod closes clutch 83. When the indexing is completed, and this center control rod is moved upward by the means which have been described for that purpose, a collar 118 thereon comes in contact with one arm of each of the bell crank levers 120, there being one associated with each of the five control disks 73, and moves said arms upward, thereby rocking the levers and causing a vertical arm on each lever to push outward a spring actuated pin 116, the outward end of which is opposite the inner face of the associated control disk. On this inner face of each control disk is a lug 73$^d$ having a beveled face. The outer end of the associated pin 116 has also a beveled face. When these two beveled faces are brought into engagement by the outward movement of the pin as stated, it causes the forward turning of the control disk. This turning of the control disk accomplishes two functions. It carries the lug 77 thereon past the lug 78 on the associated locking pin 79 and therefore frees that locking pin from restraint and permits the lock pin spring to force the lock pin inward beneath the lower end of the collar 80. These movements of the five control disks likewise carry their lugs 76 thereon past and out of engagement with the lugs 75 on the associated clutch operating levers 70, and allows said levers to be moved. Each is moved back to the position from which it was withdrawn when the associated clutch member 48 was moved in neutral position by spring actuated mechanism provided for that purpose. When each member 48 has completed that movement it will be again engaged with the fast driving member 47 of the associated feed mechanism. The mechanism for actuating each clutch lever consists of a spring plunger 71 mounted in the upper end of the lever 70 and projecting therefrom into engagement with a V-shaped block 69 on the end of a sliding rod 68. Associated with each rod 68 is a bell crank lever 67 one arm of which engages the rod 68 and the other with an associated vertically movable sliding bar 66. On the lower end of each sliding bar 66 a roller 65 is mounted for engagement with a cam block 64 (see Fig. 3) which is adjustably fixed to the associated cam disk 49, and also with another cam 72 also fixed to this same cam disk.

The cam 72 is fixed to the cam disk at such a point as that when the cam disk is just coming to the position it occupies when the associated tool slide has completed its downward feed movement this cam disk will engage the roller 65 and move the bar 66 downwards, whereby the bar 68 will be moved outwards far enough to carry the point of the block 69 over the point of the spring plunger 71. The reaction of the spring plunger against the opposite beveled face of the spring block will cause the lever to swing in that direction which will move the clutch member 48 into engagement with the fast member 63 of the feed mechanism.

The other cam dog on the cam disk is adjustable in a circular groove 49$^c$ on the cam disk and may be placed in such a position that it will come into engagement with the roller 65 and will move the bar 66 upwards, and thereby through the action of the bell crank upon rod 68 said rod will be moved inward, and the beveled block 69 which it carries will pass over the point of the spring plunger 71, which plunger, by reaction against the bevel face of the block 69 will cause the lever to so swing as to instantly cause the movable clutch member 48 to move into engagement with the slow member 47 of the feed mechanism. The tool slide will then go down in slow feeding movement as the result of the slow turning of the cam disk 49 and will continue that slow downward movement until it has about reached the lowest point at which point the fixed cam dog will move the bar 66 in the reverse direction and so switch the movable clutch member into engagement with a fast member of the tool slide operating mechanism.

*Mechanism for stopping and independently operating a tool slide.*

In the operation of a machine of this kind it may be necessary to stop any tool slide 54 within its cycle, and generally during the period in which it is being slowly fed downward, for the purpose of inspecting or adjusting the tools. The machine contains mechanism by which this is possible, and which enables any tool slide to be independently raised and lowered by hand without interfering with any of the automatic functions of the machine.

Each tool slide 54 may be stopped by pushing an operating lever 124 from left to right. This operating lever is secured to the lower end of a rock shaft 125 upon the upper end of which is secured an arm 126 having a V-shaped notch in its side; which notch, as the rock shaft is rocked, will pass over the upper end of the clutch operating lever 70 and positively move it to neutral position regardless of what position it was in before that engagement took place. When the clutch lever is in this neutral position the associated slide is wholly disconnected from the power feed; and all parts of this particular feeding mechanism remain just where they were.

The tool slide may now be raised and lowered by turning a hand wheel 127 fixed to shaft 128 on which a spiral gear 129 is secured, said gear meshing with the spiral gear 130 on a shaft 131 carrying also a pinion 132 which engages with the gear on the edge of the cam disk 49; wherefore, said cam disk being disconnected with the power drive, may be turned in either direction with the result of raising or lowering the associated tool slide. Whenever the tool inspection or adjustment is completed, the tool slide is then, by means of this hand mechanism, brought to a position in which its tool is close to the place at which it should resume the cutting operation. Then by moving lever 124 in the opposite direction the clutch operating lever 70 will be released from restraint. The action of the spring plunger 71 upon the beveled spring block 69 will cause this lever to return to the operation of the lever 124, and thereupon the tool slide will proceed to complete its cycle just as if it had not been interrupted.

*Operation of the machine.*

It will be understood that there are five sets of the described mechanisms for operating the tool slides, and for rotating the spindles.

It will be remembered that as each tool slide reaches the top of its path its operating mechanism is thrown out of action by the operation of the associated control disk 73 in moving the clutch operating lever 70 to neutral position. This same control disk also withdraws the associated lock pin 79. Each of the lock pins is independently withdrawn by the associated control disk 73, as the associated slide reaches its uppermost position. When the last of the five tool slides reaches its uppermost position the last lock pin is withdrawn, and the various parts of the machine are in position to begin a new cycle, which begins with the dropping of the center control rod 81. As before stated, this will drop automatically if the hand control mechanism 97 is set in the proper position. If it is not, the operator, after he has removed a finished piece of work from the spindle at the loading station and has put a new piece of work in, will turn the hand control device and will release the center control rod, which will thereupon drop. During the first part of the lowering motion of the control rod 81 the spindle driving clutch 2 will be disengaged by means of clutch shifting lever 6, which as stated is actuated by the descending center control rod; and the clutch brake member 7 will engage the stationary brake seat 9 at the end of the lowering motion of the center control rod, and so stop the spindle drive at once. When the control rod 81 is almost in its lowered position it will engage the Geneva motion control clutch 83 by means of a sleeve 100 on said control rod, which acts upon the clutch operating lever 101, and close the clutch, whereupon the Geneva motion gear 88 is started.

It will be observed that the control rod 81 will drop instantly when the last one of the five catch pins 79 and the operator's catch pin 98 are withdrawn, being forced down by the spring and its weight. To slightly retard the speed of lowering the control rod 81 an air cushion in the form of a dash pot is provided. The lower end of the center control rod slides in this dash pot 102$^a$, said dash pot being a chamber in the upper end of the stationary bearing shaft 102. The air in said dash pot will be forced out through an air hole 103 in the lower end of the control rod, but forms an adequate cushion for the descending control rod.

gear 88 is to withdraw the lock bolt 104 by means of cam ring 105 and lever 106 which lowers the lock bolt against power spring 107. This withdrawal of the lock pin 104 takes place, in the construction shown, within the first 3° of movement of the Geneva motion gear, and before the roller 89 on the Geneva motion gear (which is just entering a groove 90 on the center gear) has started that gear. The roller 89 entering a slot 90 on the center gear 91 will rotate said center gear a distance of 60°. This causes the turret to be rotated 60° by means of gear 93, shaft 94, gear 95, and internal gear 96 bolted to the turret, the gears 91—93, and 95—96 having an equal ratio.

When the turret 92 has been rotated slightly more than half the distance it turns in carrying the spindles to the next stations, the cam 113 will start to raise the center control rod 81, by the action of lever 115. But a cam 109 on gear 88 will prevent the Geneva motion clutch 83 from disengaging while the center control rod 81 is being raised, by means of the roller 110 which projects into a groove in the movable clutch member 83 and is mounted on rod 111 which has the dog 112 on its lower end riding on said circular cam 109 to prevent rod 111 from lowering.

The Geneva motion gear 88 before the turret reaches its new position will have released the lock bolt 104; and as soon as a lock bolt socket 117 in the turret comes to register with said lock bolt, the lock bolt will enter into the same, and the turret will be locked.

The center control rod after the first ¾ of an inch of its upward movement will disengage the clutch shifting member 7 from the brake seat by raising clutch shifting lever 6.

As the center control rod 81 continues its upward movement and when it is almost in its highest position it will cause the spindle driving clutch 2 to become engaged and start up the spindle drives. At about the same time the adjustable collar 118 will force the five lock pins 116 outward by means of bell cranks 120, thereby causing the five control disks 73 to be rotated a short distance and thereby release catch pins 79, and also the five clutch operating levers 70 which are thereupon moved by the action of their respective spring plungers with the result of connecting the five feed mechanisms with the five fast driving members 63 therefor.

The center control rod 81 now having reached its highest point will drop ¾ of an inch, and the collar 80 thereon will come to rest upon the five lock pins 79, and also upon the operator's lock pin 98, if that is in operative position, and at the same time the five spring pins 116 will return inwards to their former positions. In the meantime the indexing of the turret will have been completed and the turret will be locked in its new position.

As the Geneva motion gear 88 has now been rotated through slightly more than one third of a revolution, in which it has completed the indexing of the turret, it will now complete its own revolution while the spindle driving and tool slide mechanisms are in operation. At the end of that revolution the cam 121 on the Geneva motion gear will disengage the Geneva motion control clutch by the action of cam 121 on dog 112, thereby pulling down the rod 111. The spring point 135 will forward said Geneva motion gear a short distance after the disengagement of the driving clutch 83 and far enough to free dog 112 from cam 121, whereupon the Geneva motion gear will come to rest.

When the clutch operating lever 70 is released by the turning of the control disk 73 it is moved by its spring point so as to connect the movable clutch member with the fast driving member 63. This connection will continue, and the tool slide will therefore go down in fast motion until the adjustable dog 64 located on the face of the vertical cam disk 40 will switch the clutch 48 from fast member 63 and cause it to engage the slow or feed member 47.

Each tool slide will now go down in slow or feed motion to the end of its path, and the tool thereon will make the cut on the work for which it is adapted. When each slide has reached the bottom of its path there will be a short dwell or stoppage of the tool slide 54 during which the work spindle 32 will make a few revolutions to take the spring out of the cutting tool, this dwell being the result of the shape of the cam groove on the cam disk. The dog 72 on the vertical cam disk 49 will then act to change the driving clutch 48 from the slow member 47 to the fast member 63, and the tool slide will now go up in fast motion.

As soon as the tool slide 54 has almost reached its upward position the control disk 73 will disengage the driving clutch 48 and move it to neutral position to cause the dog 76 thereon to force the clutch lever 70 into neutral position. The control disk 73 will also withdraw the associated catch pin by means of dog 77 forcing back said catch pin. As soon as all of the five tool slides have completed their upward movement and have withdrawn their individual catch pins 79 the cycle has been completed and the control rod will drop and thus a new cycle will be begun if the operator's catch pin 98 does not prevent such control rod from dropping.

It is customary in this art to provide automatic machine tools with known mechanisms for performing desirable functions. For example, it is customary to provide counterweights for vertically movable tool slides,—such counterweights would probably be desirable adjuncts of the machine herein shown and described. It is also customary to provide mechanism for sliding a gear along a shaft on which it is slidably mounted, and hold it in desired positions thereon. Some mechanism of this sort is doubtless desirable in the machine to control the position of the several gears 30 on the shafts 31.

It has not been thought necessary, however, to show such known mechanisms in the drawings of the present machines, because notwithstanding the fact that they may be desirable they are not parts of the present invention. Moreover, if they were to be shown in the drawings they would obscure some of the essential parts of the machine, and would render additional drawings necessary.

It will be apparent to those skilled in this art that many of these specific instrumentalities shown and described for accomplishing stated specific results might be superseded by other means having equivalent functions. In fact, many changes may obviously be made with the specific construction shown without departure from the invention. It is therefore, the intention that the appended claims shall cover and include not only the combinations which they specifically define, but all combinations in which many equivalent elements and groups of elements are substitutes.

Having described my invention, I claim:—

1. In a machine of the character specified, the combination of a rotatable turret, a plurality of spindles rotatably mounted thereon, turret indexing mechanism, driving means therefor, a plurality of spindle rotating mechanisms, driving means therefor, a sliding control rod, and means operable by said rod as it is moved in one direction to disconnect the spindle rotating mechanisms from the driving means therefor, and to connect the turret indexing mechanism with the driving mechanism therefor.

2. In a machine of the character specified, the combination of a rotatable turret, a plurality of spindles rotatably mounted thereon, turret indexing mechanism, driving means therefor, a plurality of spindle rotating mechanisms, driving means therefor, a vertically disposed sliding control rod which is automatically movable downward, means restraining the control rod from so moving, means operable by said rod as it descends for disconnecting the spindle rotating mechanisms from the driving means therefor and for connecting the turret indexing mechanism with the driving means therefor.

3. In a machine of the character specified, the combination of a rotatable turret, a plurality of spindles rotatably mounted thereon, turret indexing mechanism and driving means therefor, a plurality of spindle rotating mechanisms, driving means therefor, a vertically disposed sliding control rod which is automatically movable downward, means operable by said rod as it descends for disconnecting the spindle operating mechanism from the driving means therefor and for connecting the turret indexing mechanism with the driving means therefor, and a manually controlled pin for engaging said control rod and preventing its downward movement.

4. In a machine of the character specified, the combination of a rotatable turret a plurality of spindles rotatably mounted thereon, turret indexing mechanism and driving means therefor, a plurality of spindle rotating mechanisms, driving means therefor, a vertically disposed sliding control rod, means operable by said rod as it descends for disconnecting the spindle operating mechanism from the driving means therefor and for connecting the turret indexing mechanism with the driving means therefor, and means operable by the turret indexing mechanism for raising said control rod and causing it to connect the spindle rotating mechanisms with the driving means therefor.

5. In a machine of the character specified, the combination of a rotatable turret, a plurality of spindles rotatably mounted thereon, turret indexing mechanism and driving means therefor, a plurality of spindle rotating mechanisms, driving means therefor, a vertically disposed sliding control rod, means operable by said rod as it descends for disconnecting the spindle operating mechanism from the driving means therefor and for connecting the turret indexing mechanism with the driving means therefor, means operable by the turret indexing mechanism for raising said control rod and causing it to connect the spindle operating mechanisms with the driving means therefor, means operable by the turret indexing mechanism for disconnecting said turret indexing mechanism from the driving means therefor.

6. In a machine of the character specified, the combination of a rotatable turret, a plurality of spindles rotatably mounted thereon, turret indexing mechanism and driving means therefor, a plurality of spindle rotating mechanisms, driving means therefor, a vertically disposed sliding control rod, means operable by said rod as it descends for disconncting the spindle operating mechanism from the driving means therefor and for connecting the turret indexing mechanism with the driving means therefor, means operable by the turret indexing mechanism for raising said control rod and causing it to connect the spindle operating mechanisms with the driving means therefor, means operable by the turret indexing mechanism for disconnecting said turret indexing mechanism from the driving means therefor, and automatic means for slightly turning a member of the turret indexing mechanism after said mechanism has been disconnected from the driving means therefor.

7. In a machine of the character specified, the combination of a rotatable turret, a plurality of spindles rotatably mounted thereon, turret indexing mechanism, a plurality of spindle rotating mechanisms, a control rod which is automatically movable endwise in one direction, means restraining such movement, mechanism through which said control rod when it is released and does move causes the spindle rotating mechanisms to be disconnected from their driving means, and causes the turret indexing mechanism to be connected with the driving means therefor, and a dash pot to retard the said movement of said control rod.

8. In a machine of the character specified, the combination of a rotatable turret, a plurality of spindles rotatably mounted thereon, turret indexing mechanism, a plurality of spindle rotating mechanisms, a control rod which is automatically movable endwise in one direction, means restraining said rod from so moving, a plurality of tool slides, an equal number of tool slide operating mechanisms, an equal number of restraining devices each of which acts independently to prevent the said movement of the control rod, independent mechanisms each operated by one of the tool slide operating mechanisms for withdrawing the associated restraining device from its engagement with the control rod, means through which said rod when it is released causes the spindle rotating mechanisms to be disconnected from their driving means and causes the turret indexing mechanism to be connected with the driving means therefor.

9. In a machine of the character specified, the combination of a rotatable turret, a plurality of spindles rotatably mounted thereon, spindle driving mechanisms, means including a clutch for actuating said driving mechanisms, turret indexing mechanism which includes a clutch, a vertically movable control rod, means whereby in its downward movement said control rod will release the clutch which forms a part of the spindle driving mechanism and will close the clutch which forms a part of the turret indexing mechanism, a cam fixed to a rotatable member of the turret indexing mechanism, a lever operable by said cam for raising said control rod.

10. In a machine of the character specified, the combination of a rotatable turret, a plurality of spindles rotatably mounted thereon, spindle driving mechanisms, means including a clutch for actuating said driving mechanisms, turret indexing mechanism which includes a clutch, a vertically movable control rod, means whereby in its downward movement said control rod will release the clutch which forms a part of the spindle driving mechanism and will close the clutch which forms a part of the turret indexing mechanism, a cam fixed to a rotatable member of the turret indexing mechanism, a lever operable by said cam for raising said control rod, mechanism which automatically engages said control rod when elevated and prevents its descent.

11. In a machine of the character specified, the combination of a rotatable turret, a plurality of spindles rotatably mounted thereon, spindle driving mechanisms, means including a clutch for actuating said driving mechanisms, turret indexing mechanism which includes a clutch, a vertically movable control rod, means whereby in its downward movement said control rod will release the clutch which forms a part of the spindle driving mechanism and will close the clutch which forms a part of the turret indexing mechanism, means operated by a rotatable member of the turret indexing mechanism, for raising said control rod, a plurality of tool slides, operating mechanism therefor, a plurality of lock pins associated one with each of the tool slide operating mechanisms adapted to automatically engage said control rod and prevent its descent, and mechanisms each operated by the tool slide operating mechanism with which it is associated for withdrawing the associated locking pin from engagement with said control rod.

12. In a machine of the character specified, the combination of a rotatable turret, a plurality of spindles rotatably mounted thereon, spindle operating mechanisms, turret indexing means, a plurality of tool slides, two sets of mechanism for actuating each tool slide operating mechanism, one set of mechanism including a constantly rotating gear train having at one end of the train a rapidly rotating clutch member, an axially aligned clutch member, mechanism through which the latter clutch member is driven from the associated spindle operating mechanism, and a clutch sleeve for selectively clutching the two clutch members with the tool slide operating mechanism.

13. In a machine of the character specified, the combination of a rotatable turret, a plurality of spindles rotatably mounted thereon, spindle operating mechanisms, turret indexing means, a plurality of tool slides, two sets of mechanism for actuating each tool slide operating mechanism, one set of mechanism including a constantly rotating gear train having at one end of the train a rapidly rotating clutch member, an axially aligned clutch member, mechanism through the latter clutch member is driven from the associated spindle operating mechanism, a clutch sleeve for selectively clutching the two clutch members with the tool slide operating mechanism, a clutch lever for moving said clutch sleeve, means to selectively impose yielding pressure on said clutch lever to move it in one direction or the other, means operated by a member of the tool slide operating means for changing the direction of the yielding pressure upon said clutch lever.

14. In a machine of the character specified, the combination of a vertically movable tool slide, a cam disk rotatable upon a horizontal axis having in one face a cam groove, a rod connected with the tool slide engaging said cam groove, a rotatable shaft, means through which said shaft transmits motion to said cam disk, two clutch members rotatably mounted upon said shaft, means for independently driving said clutch members, a clutch sleeve keyed to said shaft for engaging either of said clutch members.

15. In a machine of the character specified, the combination of a vertically movable tool slide, a cam disk rotatable upon a horizontal axis having in one face a cam groove, a rod connected with the tool slide engaging said cam groove, a rotatable shaft, means through which said shaft transmits motion to said cam disk, two clutch members rotatably mounted upon said shaft, means for independently driving said clutch members, a clutch sleeve keyed to said shaft for engaging either of said clutch members, dogs upon the cam disk and means operable by said dogs for selectively moving said clutch sleeve into engagement with the two independently rotatable clutch members.

16. In a machine of the character specified, the combination of a vertically movable tool slide, a cam disk rotatable upon a horizontal axis having in one face a cam groove, a rod connected with the tool slide engaging said cam groove, a rotatable shaft, means through which said shaft transmits motion to said cam disk, two clutch members rotatably mounted upon said shaft, means for independently driving said clutch members, a clutch sleeve keyed to said shaft for engaging either of said clutch members, a clutch lever carrying a spring point for actuating said sliding sleeve, a rod carrying a spring point block for engaging said spring point, and means through which the cam disk in its rotation shifts the position of said rod and its spring point block.

17. In a machine of the character specified, the combination of a tool slide, a cam disk, and means through which it actuates the tool slide, mechanism for rotating the said cam disk, two clutch members rotatable at different speeds, clutch sleeve for connecting either of them with the cam disk rotating mechanism, two dogs carried by said cam disk, and mechanism through which said dogs operate the movable clutch sleeve, and thereby cause it to selectively connect said two clutch members with the cam disk rotating mechanism.

18. In a machine of the character specified, the combination of a tool slide, a cam disk, and means through which it actuates the tool slide, mechanism for rotating the said cam disk, two clutch members rotatable at different speeds, clutch sleeve for connecting either of them with the cam disk driving mechanism, two dogs carried by said cam disk, and mechanism through which said dogs move the clutch sleeve in opposite directions,—one of said dogs being adjustably secured to said cam disk.

19. In a machine of the character specified, the combination of a tool slide, a cam disk, and means through which it actuates the tool slide, mechanism for rotating the said cam disk, two clutch members rotatable at different speeds, clutch sleeve for connecting either of them with the cam disk rotating mechanism, two dogs carried by said cam disk, a clutch lever for operating said clutch sleeve, a spring point carried by said clutch lever, a sliding bar carrying a spring point block for engagement with said spring point, a bell crank lever engaging said bar, a sliding bar engaging said bell crank lever and arranged to be engaged successively by the two dogs carried by said cam disk.

20. In a machine of the character specified, the combination of a tool slide, a cam disk having a continuous cam groove, means connected with the tool slide engaging in said cam groove, mechanism for rotating said cam disk, including a fast turning clutch member and a slow turning clutch member, a movable clutch member for selectively connecting either of said clutch members with the mechanism for turning said cam disk, a clutch lever for operating the movable clutch member, a control disk mounted upon an element which rotates synchronously with said cam disk, and having a tongue and groove connection therewith of which the tongue is shorter than the groove so as to permit a limited rotation of the control disk relative to the support therefor, said control disk being provided with an inclined lug and the clutch operating lever being provided with an inclined surface for engagement therewith whereby the clutch lever will be moved to move the clutch member to neutral position.

21. In a machine of the character specified, the combination with a base, a rotatable turret mounted thereon having a plurality of spindles, a drive shaft, a plurality of spindle drives by which the spindles may be driven from the drive shaft, clutching means for controlling the spindle drives, turret indexing mechanism, means for locking the turret to the base against rotation, means operated by the indexing mechanism for shifting the turret locking means, a slidable controller, and means by which said slidable controller controls said clutching means and the indexing mechanism.

22. In a machine of the character specified, the combination of a tool slide, means for actuating the tool slide including a cam and a shaft which rotates synchronously therewith, a control disk on said shaft capable of a very limited rotary motion upon said shaft, two rotary members for driving the slide moving mechanisms, a movable clutch member for selectively connecting either of said rotary members with the slide moving mechanism, and a clutch lever having a beveled surface, said control disk having a beveled lug for engaging said beveled surface and thereby moving the clutch lever to the neutral position.

23. In a machine of the character specified, the combination of a tool slide, means for actuating the tool slide including a cam and a shaft which rotates synchronously therewith, a control disk on said shaft capable of a very limited rotary motion upon said shaft, two rotary members for driving the slide moving mechanisms, a movable clutch member for selectively connecting either of said rotary members with the slide moving mechanism, and a clutch lever having a beveled surface said control disk having a beveled lug for engaging said beveled surface and thereby moving the clutch lever to the neutral position, a control rod and means operated thereby to turn said control disk upon its supporting shaft far enough to disengage the beveled lug thereon from said clutch lever.

24. In a machine of the character specified, the combination of a tool slide, means for actuating the tool slide including a cam and a shaft which rotates synchronously therewith, a control disk on said shaft capable of a very limited rotary motion upon said shaft, two rotary members for driving the slide moving mechanisms, a movable clutch member for selectively connecting either of said rotary members with the slide moving mechanism, and a clutch lever having a beveled surface said control disk having a beveled lug for engaging said beveled surface and thereby moving the clutch lever to the neutral position, and spring actuated mechanism for moving said clutch lever when so released.

25. In a machine of the character specified, the combination of a tool slide, means for actuating the tool slide including a cam and a shaft which rotates synchronously therewith, a control disk on said shaft capable of a very limited rotary motion upon said shaft, two rotary members for driving the slide moving mechanisms, a movable clutch member for selectively connecting either of said rotary members with the slide moving mechanism, a clutch lever having a beveled surface, said control disk having a beveled lug for engaging said beveled surface and thereby moving the clutch lever to the neutral position, a sliding control rod, and spring actuated lock pin for engaging said control rod to restrain its downward movement,—said lock pin being provided with a beveled surface and the control disk being provided with a second beveled lug for engaging said beveled surface to withdraw the lock pin from its engagement with the control rod, and means actuated by the control rod on its upward movement to turn said control disk and thereby release the lock pin and the clutch lever.

26. In a machine of the character specified, the combination of a tool slide, mechanism for actuating it including a rotatable shaft, a control disk upon said shaft capable of a limited rotary motion relative thereto, means through which the shaft turns the control disk but permits a limited rotary movement of the control disk upon the shaft, two rotary members for selectively operating the tool slide mechanism, a sliding clutch member for selectively connecting said clutch members with the tool slide actuating members, a clutch lever adapted to be engaged by a part of the control disk and moved to and held in neutral position when the tool slide has reached the top of its path, a vertically movable control rod, and means whereby said control rod turns said control disk far enough to release the clutch lever.

27. In a machine of the character specified, the combination of a tool slide, mechanism for actuating it, including a rotatable shaft, a control disk upon said shaft capable of a limited rotary motion relative thereto, means through which the shaft turns the control disk but permits a limited rotary movement of the control disk upon the shaft, two rotary members for selectively operating the tool slide mechanism, a sliding clutch member for selectively connecting said clutch members with the tool slide actuating members, a clutch lever adapted to be engaged by a part of the control disk and moved to and held in neutral position when the tool slide has reached the top of its path, a vertically movable control rod, a collar on said control rod, a bell crank lever having one arm in the path of said collar, a sliding spring actuated pin with which the other end of said lever engages said pin having a beveled end, and a control disk having a beveled lug for engagement by said pin whereby the control disk is turned far enough to release the clutch lever.

28. In a machine of the character specified, the combination of a tool slide, mechanism for actuating it including a rotatable shaft, a control disk upon said shaft capable of a limited rotary motion relative thereto, means through which the shaft turns the control disk but permits a limited rotary movement of the control disk upon the shaft, two rotary members for selectively operating the tool slide mechanism, a sliding clutch member for selectively connecting said clutch members with the tool slide actuating members, a clutch lever adapted to be engaged by a part of the control disk and moved to and held in neutral position when the tool slide has reached the top of its path, a vertically movable control rod, a collar on said control rod, a bell crank lever having one arm in the path of said collar, a sliding spring actuating pin with which the other end of said lever engages said pin having a beveled end, and a control disk having a beveled lug for engagement by said pin whereby the control disk is turned far enough to release the clutch lever, and spring actuated means for moving the clutch lever when released into the position from which it was withdrawn by said control disk.

29. In a machine of the character specified, the combination of a tool slide operating mechanism including a cam, a clutch which forms a part of the tool slide operating mechanism, a lever for actuating the clutch, a rotatable control disk, a shaft on which the disk is mounted for limited rotation thereon, said shaft rotating with said cam, the control disk being provided with a lug for engagement with the clutch lever whereby the control disk in rotating will move the clutch lever to neutral position.

30. In a machine of the character specified, the combination of a tool slide operating mechanism including a cam, a clutch which forms a part of the tool slide operating mechanism, a lever for actuating the clutch, a rotatable control disk, a shaft on which the disk is mounted for limited rotation thereon, said shaft rotating with said cam, the control disk being provided with a lug for engagement with the clutch lever whereby the control disk in rotating will move the clutch lever to neutral position, and means for turning the control disk upon its shaft so as to release the clutch lever and permit the clutch to be engaged.

31. In a machine of the character specified, the combination of clutch mechanism which forms a part of the tool slide operating mechanism, spring actuated lever for operating said clutch, a rotatable control disk, and means for rotating it while the tool slide mechanism is in operation, said control disk being provided with a beveled lug and the clutch lever being provided with a beveled surface for engagement therewith whereby the control disk in rotating will move the clutch lever to neutral position, a vertically movable control rod, means for raising and lowering the same, spring actuated lock pin adapted to engage said control rod and prevent its descent, and means whereby the control disk draws said lock pin to an inoperative position at the same time it moves the clutch lever into neutral position.

32. In a machine of the character specified, the combination of clutch mechanism which forms a part of the tool slide operating mechanism, spring actuated lever for operating said clutch, a rotatable control disk, and means for rotating it while the tool slide mechanism is in operation, said control disk being provided with a beveled lug and the clutch lever being provided with a beveled surface for engagement therewith whereby the control disk in rotating will move the clutch lever to neutral position, a vertically movable control rod, means for raising and lowering the same, spring actuated lock pin adapted to engage said control rod and prevent its descent, and means whereby the control disk draws said lock pin to an inoperative position at the same time it moves the clutch lever into neutral position, and means actuated by the control rod in its upward movement for turning said control disk far enough to cause it to release the clutch lever and the lock pin.

33. In a machine of the character specified, the combination of clutch mechanism which forms a part of the tool slide operating mechanism, spring actuated lever for operating said clutch, a rotatable control disk, and means for rotating it while the tool slide mechanism is in operation, said control disk being provided with a beveled lug and the clutch lever being provided with a beveled surface for engagement therewith whereby the control disk in rotating will move the clutch lever to neutral position, a vertically movable control rod, means for raising and lowering same, spring actuated lock pin adapted to engage said control rod and prevent its descent, and means whereby the control disk draws said lock pin to an inoperative position at the same time it moves the clutch lever into neutral position, means actuated by the control rod in its upward movement for turning said control disk far enough to cause it to release the clutch lever and the lock pin, said means comprising a spring actuated pin having a beveled end, a beveled lug on the control disk, a bell crank lever having one arm engaged with said pin and having its other arm extended over a shoulder on the control rod whereby when the control rod is raised the control disk is turned far enough to release the clutch lever and the control rod lock pin.

34. In a machine of the character specified, the combination of a tool slide, a vertical cam disk provided with a continuous cam groove, a roller riding in said cam groove, a slide which carries said roller and is connected with the tool slide, fast and slow speed driving mechanisms for said cam disk, a clutch for selectively rendering the said fast and slow speed driving mechanisms operative, a dog adjustably secured to the cam disk, and means adapted to be operated by said dog for shifting the clutch from the high speed to the low speed driving mechanism.

35. In a machine of the character specified, the combination of a tool slide and a feed unit for actuating it including a clutch, automatically operated means to move the clutch to neutral position and to release the clutch, and manually operated means to move said clutch to and to hold it in neutral position at any point in the cycle of operation of the feed unit.

36. In a machine of the character specified, the combination of a tool slide, a feed unit for actuating it including a clutch, automatically operated means to move said clutch to neutral position and to release the clutch, manually operated means to move the clutch to and to hold it in neutral position at any point in the cycle of operation of the feed unit, and manually operated means for moving the tool slide while the machine is in operation and when the clutch has been moved to neutral position by said manually operated means.

37. In a machine of the character specified, the combination of a tool slide and a feed unit for actuating the same including a clutch and a spring actuated clutch operating lever, automatically operated means to move said clutch to neutral position and to release the clutch, manually operated means to move said clutch to neutral position at any point in the cycle of operation of the feed unit, said manually operated means including a rockshaft provided with an operating handle, and an arm operated by the rockshaft having a V-shaped notch adapted to engage the clutch operating lever and move the same to neutral position.

38. In a machine of the character specified, the combination of a tool slide and a feed unit for actuating the same including a clutch, a clutch operating lever, automatically operated means to move said clutch to neutral position and to release the clutch, manually operated means to move said clutch to neutral position at any point in the cycle of operation of the feed unit, said manually operated means including a rockshaft provided with an operating handle, an arm operated by the rockshaft having a V-shaped notch adapted to engage the clutch operating lever and move the same to neutral position, and spring actuated means by which when the clutch lever is released by said arm it will be returned to the operative position from which it was moved.

39. In a machine of the character described, the combination with a frame, having a lower portion provided with a plurality of work spindles and having an upper portion provided with a plurality of vertically movable tool slides, and said frame also having a head with feed units for the different slides, each feed unit comprising a substantially flat cam member with a cam groove for actuating the associated slide and a horizontally disposed shaft supported by the frame and carrying said cam member.

40. In a machine of the character described, the combination of a tool slide, a cam disk for actuating it, fast and slow speed cam disk driving mechanism, clutch mechanism for selectively rendering said fast and slow speed driving members operative, two dogs fixed to said cam disk, and mechanism operable by said two dogs for shifting the clutch from the fast to the slow speed driving member and vice versa.

41. In a machine of the character described, a frame having a plurality of work spindles, the plurality of tool slides and a head having feed units by which the tool slides are independently actuated, each feed unit comprising a cam member having a cam groove for actuating the associated slide and having a supporting shaft at right angles to the axis of the machine.

42. In a machine of the character specified, the combination of a vertically reciprocating tool slide, a cam disk rotatable upon a horizontal axis at right angles to the axis of the machine and having in one vertical face a continuous cam groove, a guided bar fixed to the tool slide and a roller mounted on said bar and projecting into said cam groove.

43. In a machine of the character specified, the combination of a vertically reciprocating tool slide, a cam disk rotatable upon a horizontal axis at right angles to the axis of the machine and having in one vertical face a continuous cam groove, a guided bar fixed to the tool slide and a roller mounted on said bar and projecting into said cam groove, and means for alternately turning said cam disk at two different speeds.

44. In a machine of the character specified, the combination of a reciprocating tool slide, a cam disk having a continuous cam groove in one face and supported on an axis at right angles to the axis of the machine, means engaging said cam groove for actuating the tool slide, driving mechanism for said cam disk, two rotatable clutch members, a clutch for selectively connecting them with said cam disk driving mechanism, means for continuously turning one of said driving members at relatively high speed, spindle driving mechanism, mechanism through which the spindle driving mechanism rotates the other of said driving members at relatively low speed, and mechanism for automatically shifting the clutch connections back and forth from one driving member to the other.

45. In a machine of the character specified, the combination of a reciprocating tool slide, operating mechanism therefor, a control disk having a one-way driving connection with the tool slide operating mechanism, means actuated by the control disk when the tool slide reaches the top of its path to release said clutch and thereby disconnect the tool slide operating mechanism from the means which drive it.

46. In a machine of the character specified, the combination of a reciprocating tool slide, operating mechanism therefor, a control disk having a one-way driving connection with the tool slide operating mechanism, means actuated by the control disk when the tool slide reaches the top of its path to release said clutch and thereby disconnect the tool slide operating mechanism from the means which drive it, and means to turn said control disk independently of the tool slide operating mechanism far enough to release said clutch.

47. In combination in a multiple spindle automatic chucking machine, a stationary upright column having a plurality of working stations, each provided with a tool slide, a drive shaft, a feed unit for each tool slide, said feed units adapted to be operated by said drive shaft, and each feed unit being secured to the upright face of said column in operative relation to the associated tool slide.

48. In combination in a multiple spindle automatic chucking machine, a stationary upright column having plurality of working stations each provided with a tool slide, a feed unit for each tool slide, each feed unit extending through the upright wall of the column and removably secured to the outer face thereof.

49. In combination in a multiple spindle automatic chucking machine, a stationary upright column having a plurality of working stations, each provided with a tool slide, a plurality of feed units for the slides, each feed unit removably secured to the upright wall of the column and having a cam member which actuates the slide and is supported with its axis at right angles to the axis of the machine.

50. In combination in a machine of the character described, a frame having a tool slide, a cam member for actuating the tool slide and having a supporting bearing at right angles to the direction of movement of the slide and provided on one side with a cam groove, and a roller engaging in said groove and connected to the slide and located adjacent the bearing for the cam member between the latter and the slide.

51. In a machine of the character described, a rotary carrier with a plurality of work spindles, a plurality of working stations with tool slides, an indexing mechanism for the carrier, driving means for the work spindles, tool slides and indexing mechanism, and means comprising a slidable controller for automatically causing the operation of the indexing mechanism when the tool slides have completed their functions for each cycle of the machine.

52. In a machine of the character described, a rotary carrier with a plurality of rotary work spindles, a plurality of working stations with tool heads having independent operating mechanisms, an indexing mechanism for the carrier and means for automatically controlling the operation of the indexing mechanism comprising a slidable controller and independently operated devices controlled by said operating mechanisms for controlling the slidable controller.

53. In a machine of the character described, a rotary carrier having a plurality of work spindles, a plurality of working stations having tool slides, an indexing mechanism for the carrier, driving means for the work spindles, tool slides and indexing mechanism, means being provided for stopping the movement of the several tool slides when they have completed their functions during each cycle of the machine, a controller movable in one direction when the tool slides have completed their functions and means for moving the controller in the opposite direction thereby again starting the tool slides in operation.

54. In a machine of the character described, a rotary carrier having a plurality of work spindles, a plurality of working stations having tool slides, an indexing mechanism for the carrier, driving means for the work spindles, tool slides and indexing mechanism, means being provided for causing the movements of the tool slides to be stopped when they have completed their functions during each cycle of the machine, means comprising a controller which is automatically released so as to move in one direction for stopping the work spindles and starting the indexing mechanism when the movements of all the tool slides have been stopped, and means for moving the controller in the opposite direction for again starting the spindles to revolve and for starting the movements of the tool slides.

55. In a machine of the character described, a rotary carrier having a plurality of work spindles, a plurality of working stations having tool slides, an indexing mechanism for the carrier, clamping means for the carrier, driving means for the work spindles, tool slides and indexing mechanism including means for stopping the movements of the tool slides when they have completed their functions during each cycle of the machine, means for comprising a controller movable in one direction for unclamping the carrier, for stopping the rotation of the spindles and for starting the indexing mechanism, and means for moving the controller in the opposite direction to again cause the carrier to be clamped, to cause the spindles to rotate and to cause the tool slides to start their movement.

56. In a machine of the character described, a rotary carrier having a plurality of work spindles, a plurality of working stations with tool slides, an indexing mechanism for the carrier, driving means for the work spindles, tool slides and indexing mechanism, means comprising a controller movable in one direction for starting the operation of the indexing mechanism when the tool slides have completed their function during each cycle of the machine, means for moving the controller in the reverse direction to normal position, a plurality of devices controlled by the tool slide, operating means for restraining the movement to the controller in the first mentioned direction and means whereby when the controller is moved in the reverse direction, said devices are reset to again restrain the movement to the controller.

57. In a machine of the character described, a rotary carrier having a plurality of work spindles, a plurality of working stations with tool slides, an indexing mechanism, driving mechanisms for said parts and means for controlling said driving mechanisms including a controller movable first in one direction and then in the other direction to accomplish its controlling functions, and devices for restraining the movement of the controller in the first mentioned direction including one which is manually operated.

58. In a machine of the character specified, the combination of a plurality of work spindles, a plurality of tool slides, means for operating the tool slides comprising a cam member operatively connected to each tool slide, a shaft for rotating the cam member, two clutch members mounted on said shaft for driving the same and independently driven at different speeds, and a clutch sleeve keyed to the shaft between said clutch members and slidable on the shaft so as to engage either of said clutch members.

In testimony whereof, I hereunto affix my signature.

JOHN J. N. VAN HAMERSVELD.